UNITED STATES PATENT OFFICE 2,392,857

SHEET MATERIALS COMPRISING POLYVINYL CHLORIDE

John Heron McGill, Manchester, England, assignor to Imperial Chemical Industries Limited, a corporation of Great Britain No Drawing. Application May 17, 1943, Serial No. 487,333. In Great Britain April 10, 1942

9 Claims. (Cl. 260—36)

The present invention relates to an improved process for the manufacture of rolled sheet material of the kind comprising a polyvinyl chloride plastic composition.

In the manufacture of polyvinyl chloride sheet material by hot rolling of polyvinyl chloride, for instance on a calender, the difficulty arises that in order to cause the composition to work properly on the rolls they must be heated to an inconveniently high temperature at which decomposition of the polyvinyl chloride is very appreciable and at which damage can occur to any substrate of a cellulosic nature to which it is required to apply the plastic sheet. Massive polyvinyl chloride is a hard and horny material, and in order to render it somewhat softer it is usual to include a liquid of low volatility capable of gelatinising it at raised temperature, that is to say a plasticiser, for instance a dialkyl phthalate or triaryl phosphate, but the employment of sufficient liquid plasticiser to cause the composition to work satisfactorily on the rolls at a temperature low enough to obviate the aforesaid disadvantages would result in a product too soft and tacky and of insufficient strength for technical application. When a suitably restricted proportion of the plasticising liquid is employed the working temperature required is still excessively high, so that the aforesaid disadvantages due to excessive temperature and in addition discomfort and loss due to volatilisation of the plasticiser are liable to be encountered.

It has been proposed to subject a sheet of polyvinyl chloride composition for a short period of time to a still higher temperature sufficient to fuse it or at least deprive it of shape stability, without applying pressure, for instance by exposing the surface of the sheet to radiant heat, whereby its physical properties are improved and the original rough surface of the sheet is rendered brighter. The temperature required to give a product of brilliant surface is, however, inconveniently high. Moreover, whether or not the polyvinyl chloride sheet material is subjected to such heat treatment without pressure at substantially higher temperature than that at which it is formed, it is difficult to emboss the material without employing undesirably high temperatures or exposing the material for an undesirably long time at high temperatures, when it is desirable to impress a design on the sheet material.

We have found that the aforesaid disadvantages are avoidable and other advantages are obtained if there is employed a composition containing polyvinyl chloride and from about 2½ to 25 per cent of polymethyl methacrylate, based on the weight of the polyvinyl chloride, gelatinised by means of a liquid that is an active plasticiser for both polymers.

According to the present invention therefore a process for the manufacture of sheet material comprises rolling, at a raised temperature, a gelatinised composition comprising polyvinyl chloride, polymerised methyl methacrylate and a liquid plasticiser for both polymers, the proportions of polymerised methyl methacrylate and of plasticiser being such as to yield a strong non-tacky product and to permit of the gelatinised composition being rolled at a temperature at which no substantial volatilisation of the plasticiser occurs.

In putting the invention into effect, the polymethyl methacrylate may advantageously be dissolved or gelatinised at raised temperature with at least a considerable proportion of the weight of the plasticizer to be employed, the resulting homogeneous solution being milled at an elevated temperature with the finely divided polyvinyl chloride until a homogeneous plastic has been obtained, which is subsequently rolled on hot rollers into sheet form and, if desired, applied to a substrate. We have found moreover that products of exceptionally brilliant appearance may be obtained by exposing the calendered sheet material to a temperature sufficient to fuse its surface without the employment of pressure, for instance by radiant heat treatment. As common plasticisers for the purpose of the invention there may be used, for instance, tricresyl phosphate, dibutyl phthalate, or diheptyl phthalate. As will be understood, pigments and fillers may be included in the composition, desirably when it is being worked on the hot rolls, and the proportion of the plasticiser may advantageously range from about 25 to 55 per cent of the weight of the composition, excluding any pigments, dyestuffs, fillers, and other insoluble materials, depending on the degree of flexibility required. The invention is applicable both to the production of self-supporting sheets and to the production of sheets backed by a substrate, for instance of textile or paper fabric.

The invention is further illustrated by the following examples, in which the parts are parts by weight.

*Example 1*

4 parts of polymerised methyl methacrylate in granular form are dissolved in 40 parts tricresyl phosphate at 120° C. with mechanical agitation.

The resulting hot solution is milled in a Banbury mixer with 60 parts polyvinyl chloride powder and 10 parts pigment at a raised temperature until the polyvinyl chloride has been gelatinised and a homogeneous mass has been obtained. The composition is then calendered on to a textile fabric base on rolls at about 210° F. The resulting coated fabric when cold is somewhat flexible but is not limp and has a surface free from stickiness that is not readily marked by the thumb nail or with the edge of a coin, and it is eminently suitable for the fabrication of shoe uppers.

*Example 2*

10 parts of polymerised methyl methacrylate and 44 parts tricresyl phosphate are mixed together in a steam heated Werner Pfleiderer machine and when a homogeneous solution has been obtained it is transferred to a Banbury mixer and milled with 80 parts polyvinyl chloride powder at a raised temperature until the latter has been gelatinised and a homogeneous plastic is obtained. The material is then rolled out into sheets on a calender at about 240° C. The resulting sheet material is suitable for use as an acid resisting tank lining.

*Example 3*

The procedure is the same as in Example 1, except that the composition is pigmented with Cadmium red and calendered on to a paper base instead of a textile fabric base. The product is then passed through a chamber in which its exposed surface is subjected to radiant heat, until its surface commences to fuse. For this purpose the temperature of the air in the proximity of the surface may conveniently be about 180° C. The resulting product presents an exceptionally brilliant surface and excellent flexibility and may be used in place of glossy lacquered leather or the like in the manufacture of ladies' shoes.

In addition to the other plasticisers mentioned hereinbefore we may for example use esters of aliphatic dibasic acids or alkyl glycol ether phthalates.

As many apparently widely different embodiments of my invention may be made without departing from the spirit thereof, it is to be understood that I do not limit myself to the specific embodiments thereof except as defined in the appended claims.

I claim:

1. A gelatinised composition comprising polyvinyl chloride, polymerised methyl methacrylate in amount lying between 2.5% and 25% of the weight of the polyvinyl chloride and a non-polymerisable liquid plasticiser for both polymers, said plasticizer comprising between 25% and 55% by weight of the composition.

2. The process for preparing a plasticized polyvinyl chloride composition which comprises mixing polymerized methyl methacrylate with a substantially non-polymerizable liquid plasticizer which is a plasticizer for both polyvinyl chloride and said polymerized methacrylate and incorporating said mixture into polyvinyl chloride to form a substantially homogeneous composition, in such proportions that the amount of polymerized methyl methacrylate in said composition is equal to 2.5-25% of the weight of the polyvinyl chloride therein, said plasticizer comprising between 25% and 55% by weight of the composition.

3. The process for preparing a plasticized polyvinyl chloride composition which comprises dissolving polymerized methyl methacrylate in a substantially non-polymerizable liquid plasticizer which is a plasticizer for both polyvinyl chloride and said polymerized methacrylate and incorporating the resulting solution into polyvinyl chloride to form a substantially homogeneous composition, in such proportions that the amount of polymerized methyl methacrylate in said composition is equal to 2.5-25% of the weight of the polyvinyl chloride therein, said plasticizer comprising between 25% and 55% by weight of the composition.

4. The process for preparing a plasticized polyvinyl chloride composition which comprises dissolving polymerized methyl methacrylate in tricresyl phosphate and incorporating the resulting solution into polyvinyl chloride to form a substantially homogeneous composition in such proportions that the amount of polymerized methyl methacrylate in said composition is equal to 2.5-25% of the weight of the polyvinyl chloride therein, said phosphate comprising between 25% and 55% by weight of the composition.

5. The process for preparing a plasticized polyvinyl chloride composition which comprises dissolving polymerized methyl methacrylate in dibutyl phthalate and incorporating the resulting solution into polyvinyl chloride to form a substantially homogeneous composition in such proportions that the amount of polymerized methyl methacrylate in said composition is equal to 2.5-25% of the weight of the polyvinyl chloride therein, said dibutyl phthalate comprising between 25% and 55% by weight of the composition.

6. The process for preparing a plasticized polyvinyl chloride composition which comprises dissolving polymerized methyl methacrylate in diheptyl phthalate and incorporating the resulting solution into polyvinyl chloride to form a substantially homogeneous composition, in such proportions that the amount of polymerized methyl methacrylate in said composition is equal to 2.5-25% of the weight of the polyvinyl chloride therein, said diheptyl phthalate comprising between 25% and 55% by weight of the composition.

7. A gelatinized composition comprising polyvinyl chloride, polymerized methyl methacrylate in amount lying between 2.5% and 25% of the weight of the polyvinyl chloride and tricresyl phosphate in amount lying between 25% and 55% of the total weight of the polyvinyl chloride, polymerized methyl methacrylate and tricresyl phosphate.

8. A gelatinized composition comprising polyvinyl chloride, polymerized methyl methacrylate in amount lying between 2.5% and 25% of the weight of the polyvinyl chloride and dibutyl phthalate in amount lying between 25% and 55% of the total weight of the polyvinyl chloride, polymerized methyl methacrylate and dibutyl phthalate.

9. A gelatinized composition comprising polyvinyl chloride, polymerized methyl methacrylate in amount lying between 2.5% and 25% of the weight of the polyvinyl chloride and diheptyl phthalate in amount lying between 25% and 55% of the total weight of the polyvinyl chloride, polymerized methyl methacrylate and diheptyl phthalate.

JOHN HERON McGILL.